UNITED STATES PATENT OFFICE.

JOHN L. NOVARINE, OF NEW YORK, N. Y.

PROCESS OF MAKING BORAX.

SPECIFICATION forming part of Letters Patent No. 654,667, dated July 31, 1900.

Application filed September 27, 1899. Serial No. 731,881. (No specimens.)

*To all whom it may concern:*

Be it known that I, JOHN L. NOVARINE, a citizen of the Republic of Switzerland, residing at New York, (Brooklyn,) in the county of Kings and State of New York, have invented a certain new and useful Process for the Manufacture of Borax, of which the following is a specification.

This invention relates to an improved process of making borax in its various forms from any of the natural borate ores or artificial borates by subjecting the crushed and powdered ore or borate to the action of a solution of sodium sulfid, separating the borax generated in this operation by crystallizing, and purifying it by repeated recrystallizations; and the invention consists of the process of making borax in any of its known forms by subjecting the natural ore or artificial borate in an open or closed vessel under ordinary conditions or under pressure in presence of an excess of hydrosulfuric-acid gas, or sulfurous-acid gas, or carbonic-acid gas, or in presence of air to the action of a boiling solution of sodium sulfid in water, decanting off the clear solution or filtering, then allowing the borax to crystallize out.

In carrying out my improved process the natural or artificial borate is either subjected to the action of a mixture of natural or artificial sodium sulfate and charcoal, coal, coke, or any carbonaceous material at a high temperature, the resulting mass being further boiled with water or merely lixiviated and the borax thus extracted being allowed to crystallize out of the filtered or clarified solution, or the said borates are treated, after or without having previously been heated, with a solution of pure or crude sodium sulfid such as can be obtained by subjecting natural or artificial sodium sulfate to the action of a reducing agent—such as charcoal, coal, or any other carbonaceous material at a high temperature—and then crystallizing out the borax from the filtered or clarified solution thus obtained.

The following formulas and equation illustrate the reaction which takes place in the process above referred to:

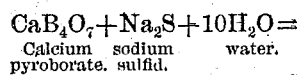
Calcium   sodium   water.
pyroborate.   sulfid.

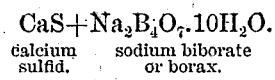
calcium    sodium biborate
sulfid.        or borax.

The proportions used correspond to about two or three times the theoretical proportion of sodium sulfid.

The main advantage of my improved process of manufacturing borax is that it is one of the most inexpensive methods of making borax from the ore, as it does not require any intermediary other than sodium sulfate and as the yield is well nigh theoretical.

Having thus described my invention, I claim as new and desire to secure by Letters Patent—

1. The process herein described of manufacturing sodium borates, consisting of the following steps: first, reducing crude sodium sulfates at a high temperature, by means of a carbonaceous material, treating the resulting mixture of sodium compounds with water, subjecting a natural borate to the action of the solution thus obtained, then filtering or decanting it off and isolating the sodium borates therein contained through repeated crystallizations, substantially as set forth.

2. The process herein described of manufacturing borax and other sodium borates, which consists in subjecting natural borates to the action of an aqueous solution of sodium sulfid obtained by any known method, then filtering or decanting off the resulting solution and isolating the borax therein contained through repeated crystallizations, substantially as set forth.

3. The process herein described of manufacturing borax and other sodium borates which consists in subjecting natural borates to the action of an aqueous solution of sodium compounds containing sodium sulfid, filtering or decanting off the resulting solution, then isolating the borax therein contained by repeated crystallizations, substantially as set forth.

In testimony that I claim the foregoing as my invention I have signed my name, in presence of two subscribing witnesses, at Brooklyn, New York, this 20th day of September, 1899.

JOHN L. NOVARINE.

Witnesses:
RICHARD A. FOSTER,
CHAS. W. BOREL.